UNITED STATES PATENT OFFICE.

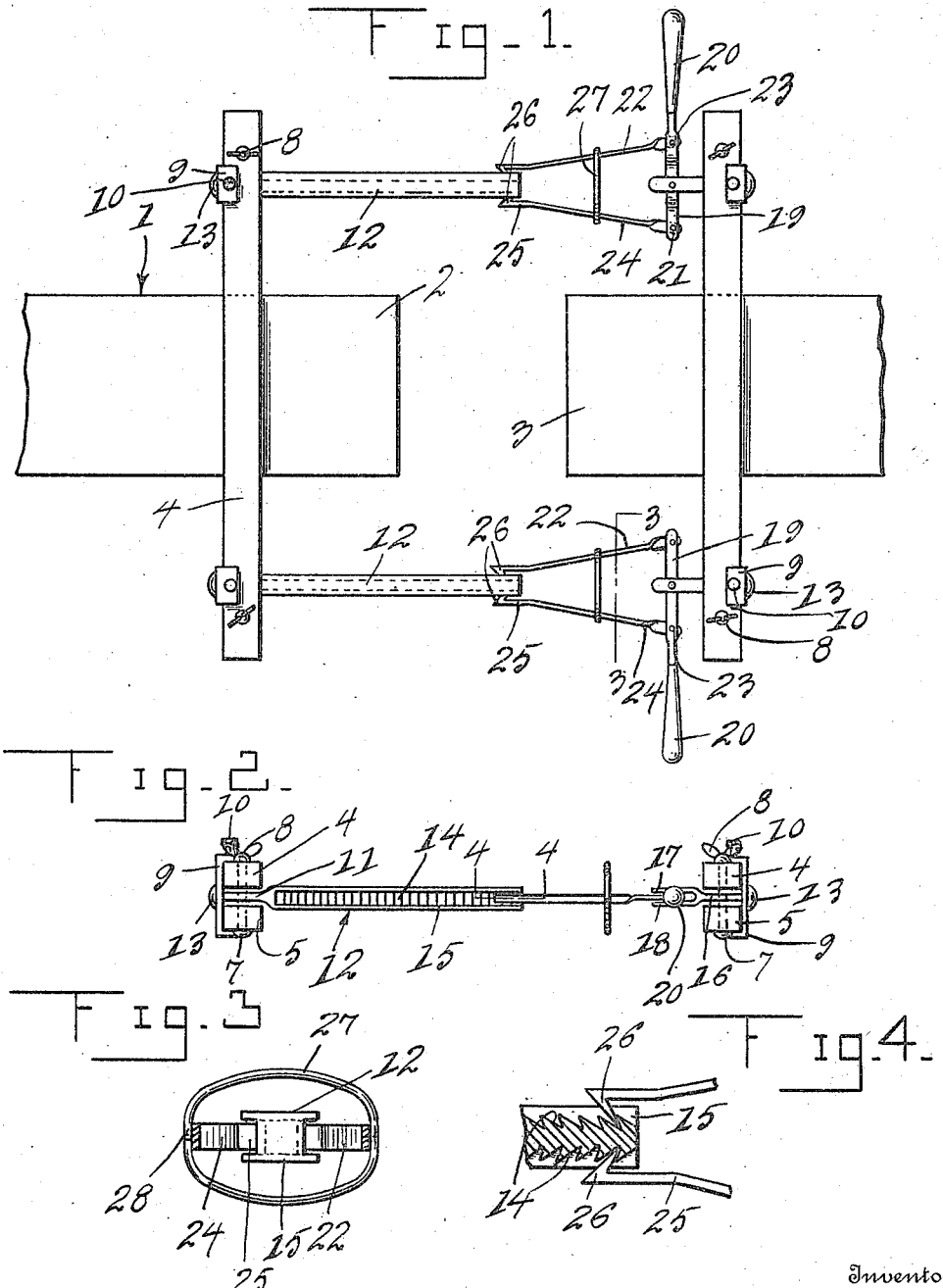

LEE EDWARD SMITH, OF MAPLESVILLE, ALABAMA.

BELT-STRETCHER.

1,184,583.

Specification of Letters Patent.

Patented May 23, 1916.

Application filed March 25, 1913. Serial No. 756,819.

*To all whom it may concern:*

Be it known that I, LEE E. SMITH, a citizen of the United States, residing at Maplesville, in the county of Chilton and State of Alabama, have invented certain new and useful Improvements in Belt-Stretchers; and I do hereby declare the following to be a full, clear, and exact description of the invention, such as will enable others skilled in the art to which it appertains to make and use the same.

This invention relates to new and useful improvements in belt stretchers, and has for its object to provide a device of the above character wherein the ends of a belt may be brought into close relation so they may be laced or stapled.

Another object of my invention is to provide a device of the above character wherein the ends of a belt will be brought so that their edges will be parallel.

With the above and other objects in view, I will now proceed to describe my invention in the following specification and accompanying drawings, in which—

Figure 1 is a top plan view of my improved belt stretcher, showing the same as it would be applied to the end of a belt; Fig. 2 is a side elevation of Fig. 1; Fig. 3 is a detail sectional view taken on line 3—3 of Fig. 1; and Fig. 4 is a detail sectional view taken on the line 4—4 of Fig. 2.

Referring to the drawings by characters of reference, 1 indicates a belt which is adapted to be stretched, having clamps fixed to its respective ends, 2 and 3. These clamps preferably comprise coacting strips 4 and 5, provided with apertures through which bolts 7 are adapted to pass, which are provided at their opposite extremities with wing nuts 8. Two U-shaped members 9 are provided for each of the clamps and have threaded apertures through which screws 10 are adapted to pass, whereby the U-shaped members are held at all times firmly against the sides of the strips 4 and 5.

Intermediate the arms of the U-shaped member 9, I preferably provide an aperture through which the reduced portion 11 of the bar 12 is adapted to extend. The outward extremity of the reduced portion is provided with a head 13, by means of which the same is held firmly in place in the U-shaped member. The opposite end of the bar is extended, as clearly shown in Fig. 2 of the drawings, and is provided with ratchet teeth 14, these teeth being countersunk in the bar and provided at their lateral extremities with flanges 15, which extend throughout the length of the bar and are adapted to act as guides for the ratchet when the device is in operation.

The opposite clamp member is provided with the U-shaped members, as previously described, having apertures intermediate their arms, through which the reduced portions 16 of fork members are adapted to extend. This fork member preferably comprises the prongs 17 and 18, between which is pivotally secured a lever 19. This lever 19 is provided at one extremity with a handle member 20 and at its opposite extremity with a pivot 21, to which is secured an arm 22. Intermediate the handle member 20 and the pivotal connection to the fork member I preferably provide a pivot 23 which is adapted to pivotally secure an arm 24 of similar construction to the arm 22. These arms 22 and 24 extend, as clearly illustrated, and are bent outwardly at their outer extremities, as indicated at 25, to form substantially parallel members at the outer extremities of which I provide pawls 26, which are adapted to engage the ratchet teeth 14 on the bar 12 when the device is in operation.

Intermediate the ends of the arm 24, I preferably secure a ring or loop 27, which is provided at its ends with flattened portions 28, to which is secured the arm 24, by means of rivets or bolts.

One of the above described ratchet bars is preferably secured to each end of the clamp member on the end of the belt, referred to as 2, the lever and fork members, as described above, being secured to each end of the clamp member, which is carried by the end of the belt referred to as 3. The belt is then drawn so that the pawls 26, carried by the arms 24 and 22, will engage the ratchet teeth on the bar 12 and, upon reciprocation of the handle 20, will work upwardly over the ratchet teeth and cause the clamp members to come closer together, whereby the ends of the belt are brought in close relation so they may be laced or otherwise secured.

While in the foregoing I have shown and described the preferred embodiment of my invention, I wish it to be understood that I may change the specific arrangements of parts without in any way departing from the spirit and scope of my invention.

Having thus fully described my invention, what I claim is:

1. A device of the character described comprising an attaching member, a lever pivoted at a point between its ends to said attaching member, an arm pivoted at one end to the lever at one side of said attaching member, another arm pivoted at one end to the lever at the opposite side of said attaching member, said arms being inclined inwardly and having their free ends provided with parallel extensions, a loop secured to one arm and inclosing the other arm, inwardly directed pawls carried by said parallel extensions, and a ratchet bar having teeth on the opposite side thereof, said teeth being adapted to be engaged by said pawls.

2. A device of the class described comprising an attaching member, a lever pivoted at a point between its ends to said attaching member, an arm pivoted at one end to the lever at one side of said attaching member, another arm pivoted at one end to the lever at the opposite side of said attaching member, said arms being inclined inwardly and having their free ends provided with parallel extensions, a loop secured to one arm and inclosing the other arm, inwardly directed pawls carried by said parallel extensions, and a second attaching member provided with a ratchet bar, said ratchet bar being provided with grooves at opposite sides thereof, the vertical walls of said grooves having ratchet teeth, said teeth being adapted to be engaged by said pawls.

In testimony whereof I affix my signature in presence of two witnesses.

LEE EDWARD SMITH.

Witnesses:
R. H. MARTIN,
W. D. BURKHALTER.

Copies of this patent may be obtained for five cents each, by addressing the "Commissioner of Patents, Washington, D. C."